April 12, 1932. H. W. CLARK 1,853,259
SHEARS
Filed Feb. 7, 1930 2 Sheets-Sheet 1

INVENTOR
Harold W. Clark
by his attorneys
Byrnes, Stebbins, Parmelee & Blenko

April 12, 1932. H. W. CLARK 1,853,259
SHEARS
Filed Feb. 7, 1930   2 Sheets-Sheet 2
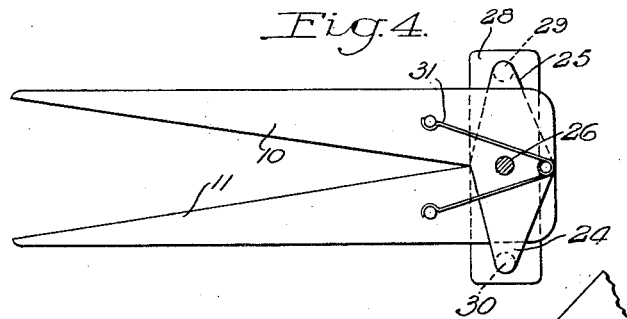
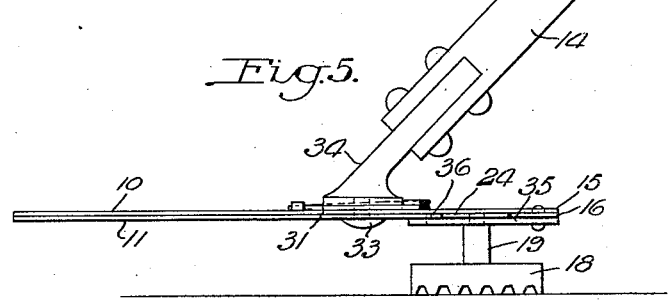
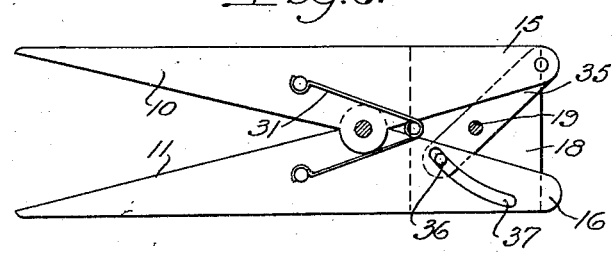
INVENTOR
Harold W. Clark
by his attorneys
Byrnes, Stebbins, Parmelee & Blenko Patented Apr. 12, 1932

1,853,259

UNITED STATES PATENT OFFICE

HAROLD W. CLARK, OF ALLIANCE, OHIO, ASSIGNOR TO THE ALLIANCE MANUFACTURING COMPANY, OF ALLIANCE, OHIO, A CORPORATION OF OHIO

SHEARS

Application filed February 7, 1930. Serial No. 426,543.

My invention relates to shears, and more particularly to shears of the portable type which are employed in caring for lawns and gardens.

Several preferred embodiments of the invention are illustrated in the accompanying drawings to which reference is made for a full understanding of the invention.

In the drawings,

Figure 4 is a view of the modified form similar to Figure 2; and

Figures 5 and 6 are similar views showing a further modification.

Figure 1:
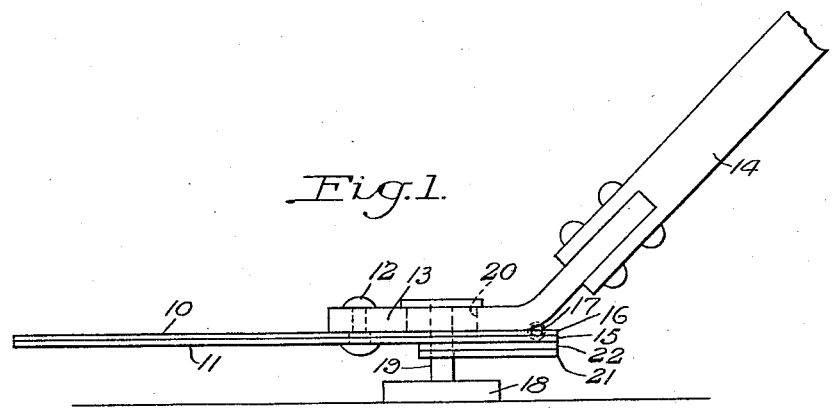
Figure 1 is a side elevation of one form of the invention.
Figure 2:
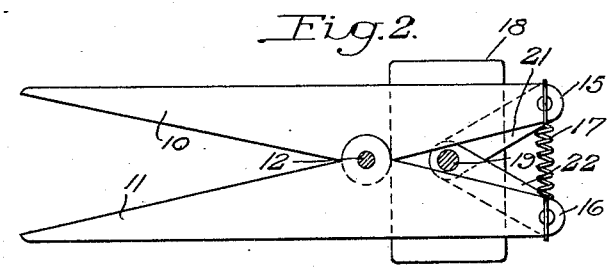
Figure 2 is a sectional view along the plane of the upper blade of the shears as shown in Figure 1.

Referring to the drawings and especially to Figures 1 and 2, the invention comprises a pair of shear blades 10 and 11, pivoted on a common axis such as that afforded by the pin 12. The pin 12 is secured to an arm 13 which projects from an operating handle 14. The blades 10 and 11 have rearward extensions 15 and 16 which are connected by a tension spring 17.

A base or foot 18 carries a vertical stem 19 which passes through a slot 20 in the arm 13. Actuating links 21 and 22 connect the rearward projections 15 and 16 of the shear blades 10 and 11 to the vertical stem 19 of the foot 18.

To operate the shears, the foot 18 is permitted to rest on the ground and the arm 13 is moved forwardly by means of the operating handle 14. The forward movement of the handle 14 carries with it the shear blades 10 and 11. The foot 18 remains on the ground and, through the medium of the links 21 and 22, forces the rearward projections 15 and 16 apart as the latter move forward. This, of course, causes the cutting edges of the blades 10 and 11 to move into co-operative relationship so as to shear the material therebetween. When the shearing has been completed, the handle 14 is retracted and the spring 17 separates the cutting edges of blades 10 and 11 by drawing projections 15 and 16 together.

Figure 3:
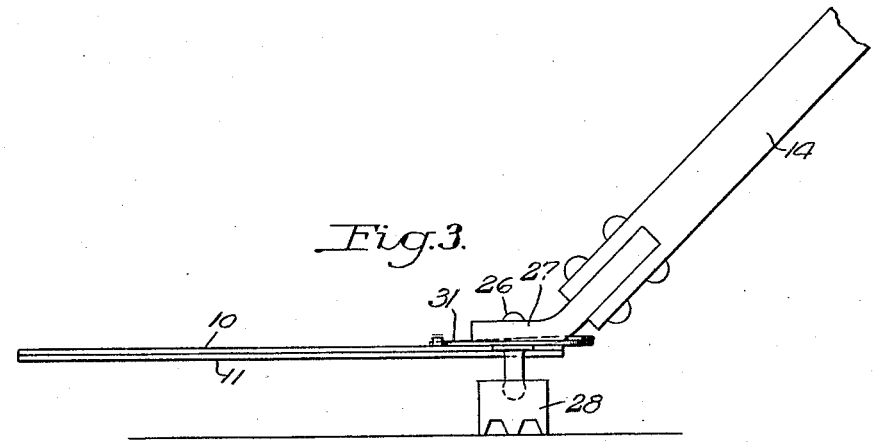
Figure 3 is a view similar to Figure 1 showing a modified form.

A modification of the invention shown in Figures 1 and 2 is illustrated in Figures 3 and 4 in which similar reference numerals are applied to corresponding elements. In the modification of Figures 3 and 4, the blades 10 and 11 have lateral extensions 24 and 25. The blades are pivoted on a pin 26 which passes through an arm 27 on the handle 14. A foot 28 adapted to engage the surface of the ground has vertical stems 29 and 30 which have pivotal engagement with the lateral extensions 24 and 25. A spring 31 tends to separate the blades 10 and 11.

The operation of this modification is similar to that of the device previously described. The foot 28 is placed on the ground and the handle 14 is actuated to move the arm 27 forward. The movement of the arm 27 causes the blades 10 and 11 to move forward, but since the foot 28 remains stationary, the blades pivot about the points 29 and 30 and so cause the blades 10 and 11 to execute a cutting stroke. The pivotal connections between the stems 29 and 30 and the extensions 24 and 25 are such as to permit free movement of the blades 10 and 11. A slight amount of play is necessary in one or the other of these connections.

A further modification of the invention is illustrated in Figures 5 and 6. According to this modification, the blades 10 and 11 are pivoted at 33 to an arm 34 projecting from the handle 14. A spring 31 serves the same purpose as in the previously described modification. The foot 18 has a central stem 19 as in Figures 1 and 2. The rearward projection 15 of the blade 10 has a link 35 pivoted thereto and to the stem 19. The link 35 extends beyond the stem 19 and has a pin 36 near the end thereof which is adapted to project into an arcuate slot 37 formed in the rearward projection 16 of the blade 11.

This device is operated in a manner similar to that already described. The foot 18 is placed on the ground and the handle 14 is actuated to move the blades 10 and 11 forward. As the blades 10 and 11 move forward, the link 35 is rotated about the stem 19. The resulting movement of the pin 36 in the slot 37 causes the blade 11 to move into cutting relation with the blade 10. When the handle 14 is withdrawn, the spring 31 forces the blades 10 and 11 apart.

It will be apparent from the foregoing description that each of the modifications herein described has many features of novelty and utility.

Although I have described only a few modifications of the invention, I do not wish to be limited to the specified details illustrated since changes will, no doubt, occur to those skilled in the art. Such changes may be made without departing from the spirit of the invention as defined by the appended claims.

I claim:

1. In a portable shear, a pair of blades mounted on an operating handle, at least one of said blades being adapted for oscillation, a foot adapted to rest on the ground, and having connections to said blades for operating them on forward movement of said blades relative to said foot.

2. In a shear, the combination with a foot adapted to remain stationary during a cutting stroke of the shear blades, of an operating handle for the blades and connections between said foot and said blades whereby forward movement of the latter relative to the former causes a cutting stroke to be effected by the blades.

3. A shear having a movable blade, a handle, secured to said blade, a foot for supporting the shear and means whereby forward movement of the blade relative to the foot causes the blade to execute a cutting stroke.

4. A shear having a foot, a handle, and blades on said handle connected to said foot whereby forward movement of the blades relative to the foot causes them to execute a cutting stroke.

5. In a shear, a handle, blades operatively secured thereto, a shear supporting member and connections between said member and said blades whereby, when the latter are moved forward relative to the former, they execute a cutting stroke.

6. In a shear, a handle, blades pivoted thereto, and a foot, the blades being movable along the line of shearing independently of the foot, and connections between the foot and blades for causing the latter to execute a cutting stroke on movement thereof relative to the blades.

7. In a shear, the combination with a supporting handle, blades pivoted thereto, a ground-engaging foot adapted to remain stationary during limited movement of said blades along the line of shearing, and connecting means between said blades and foot for effecting a cutting stroke of the blades on such movement thereof.

8. In a shear, blades pivoted to a handle for movement in a horizontal plane just above the ground, a ground engaging foot secured to the blades and means for causing a shearing operation of said blades on forward movement of the blades and handle relative to the foot.

In testimony whereof I have hereunto set my hand.

HAROLD W. CLARK.